United States Patent
Ng et al.

(10) Patent No.: US 6,898,568 B2
(45) Date of Patent: May 24, 2005

(54) SPEAKER VERIFICATION UTILIZING COMPRESSED AUDIO FORMANTS

(75) Inventors: Kai Wa Ng, Singapore (SG); Nan Sheng Lin, Fremont, CA (US); Jing Zheng Ouyang, San Jose, CA (US)

(73) Assignee: Innomedia PTE LTD, Singapore (SG)

( * ) Notice: Subject to any disclaimer, the term of this patent is extended or adjusted under 35 U.S.C. 154(b) by 712 days.

(21) Appl. No.: 09/904,999

(22) Filed: Jul. 13, 2001

(65) Prior Publication Data

US 2003/0014247 A1 Jan. 16, 2003

(51) Int. Cl.[7] ............................................... G10L 17/00
(52) U.S. Cl. ...................... 704/246; 704/209; 704/270; 704/273
(58) Field of Search ................................ 704/243, 246, 704/250, 231, 270, 273, 209, 207, 208

(56) References Cited

U.S. PATENT DOCUMENTS

| | | | |
|---|---|---|---|
| 4,696,038 A | | 9/1987 | Doddington et al. |
| 4,731,846 A | | 3/1988 | Secrest et al. |
| 4,899,385 A | | 2/1990 | Ketchum |
| 5,381,512 A | * | 1/1995 | Holton et al. ............ 704/200.1 |
| 5,414,755 A | | 5/1995 | Bahler |
| 5,522,012 A | * | 5/1996 | Mammone et al. ......... 704/250 |
| 5,608,784 A | | 3/1997 | Miller |
| 5,706,399 A | | 1/1998 | Bareis |
| 6,006,175 A | * | 12/1999 | Holzrichter ................. 704/208 |
| 6,151,571 A | | 11/2000 | Pertrushin |
| 6,427,137 B2 | * | 7/2002 | Petrushin .................... 704/273 |
| 6,463,415 B2 | * | 10/2002 | St. John ..................... 704/273 |
| 6,501,966 B1 | * | 12/2002 | Bareis et al. ................ 455/563 |

OTHER PUBLICATIONS

Fumitada Itakura, Minimum Prediction Residual Principal Applied to Speech Recognition IEEE Transactions on Acoustics, Speech, & Signal Processing vol. ASSP–23, No 1, Feb. 1975.

Aaron Rosenberg, Automatic Speaker Verification: A Review Proceedings of the IEEE, vol 64, No 4, Apr. 1976.

* cited by examiner

Primary Examiner—Susan McFadden
(74) Attorney, Agent, or Firm—Timothy P. OHagan

(57) ABSTRACT

A identity of a remote speaker is verified by receiving compressed audio formants from a remote Internet telephony client and comparing the compressed audio formants with sample compressed audio formants known to represent the person the remote speaker purports to be. The compressed audio formants include energy and pitch data characterizing the residue of the speaker uttering a predetermined pass phrase and a plurality of formant coefficients characterizing the resonance of the speaker.

12 Claims, 4 Drawing Sheets

| Frame | 1 | 2 | 3 | 4 | 5 | 6 | 7 | . | . | . | N |
|---|---|---|---|---|---|---|---|---|---|---|---|
| Pitch | | | | | | | | | | | |
| Energy | | | | | | | | | | | |
| Formant Coefficient 1 | | | | | | | | | | | |
| Formant Coefficient 2 | | | | | | | | | | | |
| Formant Coefficient 3 | | | | | | | | | | | |
| Formant Coefficient 4 | | | | | | | | | | | |
| . . . | | | | | | | | | | | |
| Formant Coefficient N | | | | | | | | | | | |

Figure 3

SPEAKER VERIFICATION UTILIZING COMPRESSED AUDIO FORMANTS

TECHNICAL FIELD

The present invention generally relates to speaker verification systems and, more particularly to an apparatus and method for performing remote speaker verification utilizing compressed audio formants.

BACKGROUND OF THE INVENTION

Speaker verification systems utilize a spoken voice password, or sequence of words forming a phrase, (herein the term pass phrase will be used to include either a single password, a sequence of pass words, or a pass phrase), to determine whether the person uttering the pass phrase is actually the registered person. In known systems, the registered person typically must utter the pass phrase during a registration process during which the registered speaker's identity is verified utilizing a driver's license, passport, or some other acceptable form of identification. The registered person's utterances are then stored as a reference utterance. Typically the reference utterance is stored as an analog waveform or a digital representation of an analog waveform which is received from the microphone circuit (including appropriate amplifiers) into which the registered person uttered the reference utterance.

Later, when a speaker claims to be the registered person, the speaker is prompted to utter the voice pass phrase into a microphone. The analog waveform or digital representation of the analog waveform from the microphone is then compared to the waveform of the reference pass phrase and a comparison algorithm is utilized to calculate a value representing the dissimilarity between the two waveforms. If the dissimilarity is within a predetermined threshold, then the speaker verification system can conclude that the speaker is the registered speaker.

While speaker verification systems are useful for verifying the claimed identity of a person over a telephone, the analog waveform of the uttered pass phrase can be distorted by its transmission over traditional telephone lines to the server performing the verification. Such distortions tend to generate false negative errors (e.g. utterance that should match is determined to be a non-match). While transmission of a digital representation of the analog waveform may eliminate distortions, the bandwidth required for transmission is significantly increased.

Known voice compression algorithms are used to compress spoken audio data for transmission to a remote location over packet switched networks. However, because of distortion caused by compression and decompression, the resulting waveforms again would yield significant false negatives if utilized for speaker verification.

As such, there is a need in the art for a speaker verification system and method for verifying the identity of a remote speaker that does not suffer the disadvantages of known systems.

SUMMARY OF THE INVENTION

A first aspect of the present invention is to provide a method of performing speaker verification. The method comprises obtaining a plurality of frames of compressed audio formants representing the speaker uttering a predetermined pass phrase. Each frame includes energy and pitch data characterizing the residue of the speaker uttering the predetermined pass phrase and includes a plurality of formant coefficients characterizing the resonance of the speaker uttering the predetermined pass phrase. The identity of the speaker is verified by matching at least one of energy data, pitch data, and formant coefficients in the frames representing the speaker uttering the predetermined pass phrase to at least one of energy, pitch, and formant coefficients of a plurality of sample frames stored in memory.

The step of obtaining frames of compressed audio formants may include receiving the frames of compressed audio formants from a remote Internet telephony device. Further, obtaining the frames of compressed audio formants at the remote Internet telephony device may include i) receiving audio input of the speaker uttering the pass phrase from a microphone, ii) digitizing the audio input, iii) converting the digitized audio input to a sequence of frames of compressed audio formants, iv) further compressing the sequence of frames of compressed audio formants to generate compressed audio data packets, and v) sending the compressed audio data packets from the remote Internet telephony device.

The step of verifying the identity of the speaker may further include normalizing, within the time domain, the sequence of frames of compressed audio formants with the plurality of sample frames stored in memory utilizing at least one of the energy, pitch, and formant coefficients.

A second aspect of the present invention is to provide a method of determining whether a speaker is a registered speaker. The method comprises obtaining compressed audio formants representing the speaker uttering a predetermined pass phrase. The compressed audio formants include energy and pitch data characterizing the residue of the speaker uttering the predetermined pass phrase and formant coefficients characterizing the resonance of the speaker uttering the predetermined pass phrase. The determination is made by matching at least one of energy, pitch, and formant coefficients from the compressed audio formants to predetermined combinations of at least one of energy, pitch, and formant coefficients of sample compressed audio formants known to represent the registered speaker.

The step of obtaining compressed audio formants may include obtaining the compressed audio formants from a remote location and sending the compressed audio formants from the remote location. Obtaining compressed audio formants at the remote location may include: i) receiving audio input of the speaker uttering the pass phrase from a microphone, ii) digitizing the audio input, and iii) compressing the digitized audio input to generate compressed audio formants.

The compressed audio formants may be a sequence of frames and each frame may include an energy value, a pitch value, and a plurality of formant coefficients. The sample compressed audio formants are a sequence of frames and each frame includes an energy value, a pitch value, and a plurality of formant coefficients.

The step of determining whether the speaker is the registered speaker may further include normalizing the sequence of frames of compressed audio formants with the sequence of frames of sample compressed audio formants within the time domain.

A third aspect of the present invention is to provide a speaker verification server for verifying the identity of a remote speaker. The server comprises: a) a network interface for receiving compressed audio formants via a packet switched network representing a remote speaker uttering a predetermined pass phrase as audio input to a remote telephony client; b) a database storing a plurality of compressed audio formant samples, each representing a registered speaker uttering a registered pass phrase as audio input; and c) a verification application operatively coupled to each of the network interface and the database for comparing the compressed audio formants representing the remote speaker to a compressed audio formant sample to determine whether the remote speaker is the registered speaker.

The compressed audio formants may include energy and pitch data characterizing the residue of the speaker uttering the predetermined pass phrase and formant coefficients characterizing the resonance of the speaker uttering the predetermined pass phrase. Each compressed audio formant sample may include energy and pitch data characterizing the residue of the registered speaker uttering the registered pass phrase and formant coefficients characterizing the resonance of the registered speaker uttering the registered pass phrase. And, the verification application may determine whether the at least one of energy, pitch, and formant coefficients from the compressed audio formants is similar to the at least one of the energy, pitch, and formant coefficients of the sample.

The compressed audio formants may include a sequence of frames and each frame may include an energy value, a pitch value, and a plurality of formant coefficients representing a portion of the utterance of the speaker. Similarly, each compressed audio formant sample may include a sample sequence of frames and each frame may include an energy value, a pitch value, and a plurality of formant coefficients representing a portion of the utterance of the registered speaker. As such, the verification application may determine whether the sequence of frames is similar to the sample sequence of frames by comparing energy, pitch, and formant coefficients from each fame in the sequence of frames to energy, pitch, and formant coefficient from a corresponding frame in the sample sequence of frames. Further, the verification application may normalizes the sequence of frames with the sample sequence of frames within the time domain.

A fourth aspect of the present invention is to provide a telephony server. The telephony server comprises a network interface for sending and receiving compressed audio formants to and from each of a plurality of telephony clients and a telephony server application for maintaining a telephony session between an initiating telephony client and a terminating subscriber loop. The telephony server application functions to: i) receive compressed audio formants from the initiating telephony client, decompressing the compressed audio formants to generate an audio signal, and send the audio signal to the terminating subscriber loop; and ii) receive an audio signal from the terminating subscriber loop, compress the audio signal to compressed audio formants, and send the compressed audio formants to the telephony client. The telephony server further includes: a) a database storing a plurality of compressed audio formant samples, each representing one of a plurality of authorized users uttering a registered pass phrase; and 2) a verification application operatively coupled to each of the network interface and the database for comparing compressed audio formants received from the telephony client with at least one of the plurality of compressed audio formant samples to determine whether an operator of the telephony client is an authorized user.

Again, the compressed audio formants may include energy and pitch data characterizing the residue of the speaker uttering the predetermined pass phrase and a plurality of formant coefficients characterizing the resonance of the speaker uttering the predetermined pass phrase and, each compressed audio formant sample may similarly include energy and pitch data characterizing the residue of the registered speaker uttering the registered pass phrase and a plurality of formant coefficients characterizing the resonance of the registered speaker uttering the registered pass phrase.

The verification application may determine whether at least one of energy, pitch, and formant coefficients from the compressed audio formants is similar to at least one of the energy, pitch, and formant coefficients of a compressed audio formant sample. The compressed audio formants may be sequence of frames and each frame may include an energy value, a pitch value, and a plurality of formant coefficients representing a portion of the utterance of the speaker. Similarly, each compressed audio formant sample may be a sample sequence of frames and again, each frame may include an energy value, a pitch value, and a plurality of formant coefficients representing a portion of the utterance of the registered speaker.

The verification application may normalize the sequence of frames with the sample sequence of frames within the time domain and may determine whether sequence of frames is similar to the sample sequence of frames by comparing at least one of energy, pitch, and formant coefficients in each frame to at least one of energy, pitch, and formant coefficients in a corresponding frame from the sample sequence of frames.

BRIEF DESCRIPTION OF THE DRAWINGS

FIG. 3 is a table representing Compressed audio formants of an utterance in accordance with this invention.

DESCRIPTION OF THE PREFERRED EMBODIMENTS

Figure 1:
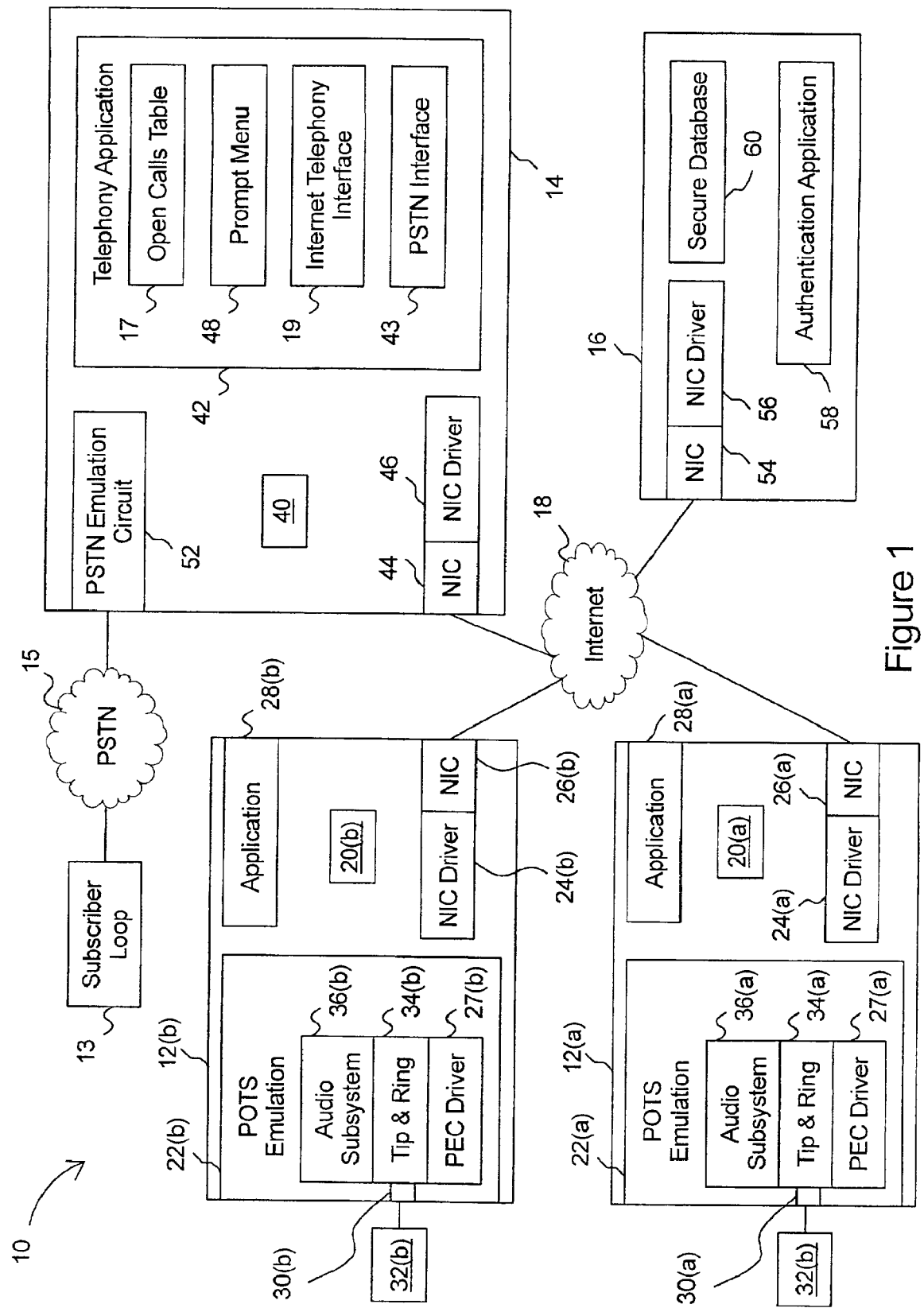
FIG. 1 is a block diagram of a speaker verification system in accordance with one embodiment of this invention.

The present invention will now be described in detail with reference to the drawings. Referring to FIG. 1, the speaker verification system 10 of this invention includes a network 18 which, in the exemplary embodiment is the Internet. The network 18 interconnects each of a plurality of Internet telephony clients 12(*a*) and 12(*b*), an application server 14, and an authentication server 16.

Each telephony client 12(*a*) and 12(*b*) may be a desktop computer which includes a processing unit 20(*a*), 20(*b*) for operating a plain old telephone service (POTS) emulation circuit 22(*a*), 22(*b*), a network interface circuit 26(*a*), 26(*b*), a driver 27(*a*), 27(*b*) for the POTS emulation circuit 22(*a*), 22(*b*), a driver 24(*a*), 24(*b*) for the network interface circuit 26(*a*), 26(*b*), and an Internet telephony application 28(*a*), 28(*b*). Each of the POTS emulation circuit 22(*a*), 22(*b*) and the network interface circuit 26(*a*), 26(*b*) may be cards that plug into the computer expansion slots.

The POTS emulation circuit 22(*a*), 22(*b*) includes an RJ-11 female jack 30(*a*), 30(*b*) for coupling a traditional POTS telephone handset 32(*a*), 32(*b*) to the emulation circuit 22(*a*), 22(*b*). A tip and ring emulation circuit 34(*a*), 34(*b*) emulates low frequency POTS signals on the tip and ring lines for operating the telephone handset 32(*a*), 32(*b*).

An audio system 36(a), 36(b) interfaces the tip and ring emulation circuit 34(a), 34(b) with the Internet telephony application 28(a), 28(b). More specifically, the audio system 36(a), 36(b) operates to digitize audio signals from the microphone in the handset 32(a), 32(b) and present the digitized signals to the Internet telephony application 28(a), 28(b), and simultaneously, operates to receive digital data representing audio signals from the Internet telephony application 28(a), 28(b) (representing the voice of a remote caller), convert the data to analog audio data, and present the analog audio data to the tip and ring lines for driving the speaker of the handset 32(a), 32(b) in accordance with the analog signal received from the audio system 36(a), 36(b).

The Internet telephony application 28(a), 28(b) provides the call signaling, the media session set up, and the media session exchange of compressed audio data packets with a remote telephony client. The Internet telephony application 28(a), 28(b) further provides for compressing digitized audio data (from the microphone) into frames of compressed audio formants and subsequently compressing an array of frames of compressed audio formants to compressed audio data packets for sending to a remote computing device with similar Internet telephony capabilities. And, in reverse, provides for receiving compressed audio data packets from the remote computing device, regenerating the array of frames of compressed audio formants, and decompressing the compressed audio formants to digitized audio data for driving the speaker. In the exemplary embodiment, the Internet Telephony application 28(a), 28(b) utilizes the International Telephony Union (ITU) H.323, H.245, and Q.931 standards for call signaling, media session set up, and the exchange of compressed audio data packets and utilizes the ITU G.723, ITU G.729 or other formant based compression standard for compressing digitized audio data into an array of frames of compressed audio formants.

The network interface circuit 26(a), 26(b) and the network interface driver 24(a), 24(b) together include the hardware and software circuits for operating the IP protocols and communicating packets of data over the network 18 with other devices coupled thereto.

While the above description of telephony clients 12(a) and 12(b) references a desk top computer, other configurations of a telephony client 12(a) and 12(b) are envisioned by this invention and include an Internet telephony appliance which operates as a telephone with a network interface and includes the above systems embedded therein. Such Internet telephony appliance could be a home telephone coupled to the network 18 or could be structured as a portable telephone coupled to the network 18 through the cellular telephone network, the PCS network, or other wide area RF network.

The application server 14 provides a service via the network 18 to the user of each of the plurality of Internet telephony clients 12(a) and 12(b). The particular type of service provided is not critical to this invention, however, it is envisioned that access to the service is limited to registered account holders. For example, if application server 14 enabled users to access and manipulate funds in a bank account, the service would be limited to the registered account holder for each account. Similarly, if the application server 14 provided Internet telephony telephone service, the service would be limited to registered account holders for purposes of billing. The application can provide any service wherein the user is required to log into an account on the application server to use, access, or manipulate data related to the account.

In the exemplary embodiment, the application server 14 provides Internet telephony service between an Internet telephony client 12(a) or 12(b) and a plain old telephone service (POTS) subscriber loop 13 coupled to the public switched telephony network 15 (PSTN). In the exemplary embodiment, the user of the Internet telephony client 12(a) or 12(b) may be charged for initiating an Internet telephony call to the destination subscriber loop 13. As such, the user of the Internet telephony client 12(a) or 12(b) must identify his or her account so that the correct account may be charged and the user must be authenticated to assure that he or she is really the registered account holder prior to the application server 14 connecting a call to the subscriber loop 13.

The application server 14 includes a processing unit 40, an Internet telephony application 42, a network interface circuit 44, and a driver 46 for the network interface circuit 44, and a PSTN emulation circuit 52.

The network interface circuit 44 and the network interface driver 46 together include the hardware and software circuits for operating the IP protocols and communicating frames of data over the network 18 with other devices coupled thereto. The PSTN interface circuit 52 includes the hardware circuits for coupling analog POTS signals to PSTN lines.

The Internet telephony application 42 provides the Internet telephony to PSTN telephone services to users of the Internet telephony clients 12(a) and 12(b). As such, the Internet telephony application 42 also includes a Internet telephony interface 19 which provides for call signaling, media session setup, and the media session exchange of compressed audio data packets with each remote Internet telephony client 12(a) and 12(b). Again, the call signaling, media session setup, and media session exchange of compressed audio data packets may be in compliance with the ITU Q.931, H.242, and H.323 standards and the compression/decompression of digital audio data may be in compliance with the ITU G.723, ITU G.729 or other formant based standard such that compatibility with the Internet telephony clients 12(a) and 12(b) is achieved.

The Internet telephony application 42 also includes a PSTN interface 43 which, in conjunction with the PSTN emulation circuit 52, provide for emulation of the low frequency POTS signals on the tip and ring lines coupled to the PSTN 15. More specifically, audio signals from the PSTN are digitized for use by the Internet telephony application 42 and digital audio signals from the internet telephony application 42 are converted analog audio data for modulation onto the PSTN 15. The PSTN interface 53 also provides for call set up with a subscriber loop 13 over the PSTN 15 utilizing PSTN standards (e.g. dialing, ringing, call pickup ect.)

The Internet telephony application 42 also includes an open calls table which maps an Internet telephony client 12(a) (for example) with the destination subscriber loop 13 such that the Internet-telephony-to-PSTN session may be maintained by converting compressed audio data packets received from the Internet telephony client 12(a) via the Internet 18 and the network interface circuit 44 to analog POTS signals for transmission to the subscriber loop 13 via the PSTN emulation circuit 52. And, in the other direction, by converting analog POTS signals received on the subscriber loop 13 via the PSTN emulation circuit 52 to compressed audio data packets for transmission to the Internet telephony client 12(a) via the Internet 18.

As discussed previously, the application 42 will not connect an Internet telephony call to a subscriber loop 13 unless and until the user of the remote Internet telephony client 12(a) has identified the account to which charges should be applied and has been authenticated as a registered user of such account. As such, the Internet telephony application 42 also includes a prompt menu 48 which functions to provide audio prompts to the user of the remote Internet telephony client 12(a) (for example) after the Internet telephony session has been established. The prompt menu 48 includes a "tree" of menu choices for the operator, an brief audio recording of the possible menu choices at each "tree branch" to prompt the operator of the remote Internet telephony client 12(a) to make a choice and/or enter data. As such, an operator of the Internet telephony client 12(a) may "navigate" through the menu of appropriately utilize the services provided by the Internet telephony application 42. The prompt menu will include at least a prompt for the user of the remote Internet telephony client 12(a) to identify the account and a prompt for the user to utter a predetermined pass phrase for purposes of identifying the user via voice recognition. The uttered pass phrase will be sent from the Internet telephony client 12(a) to the application server 14 as compressed audio data packet(s) as discussed above.

Once the Internet telephony application 42 has obtained identification of the account and received the compressed audio data packets representing the user of the Internet telephony client 12(a) uttering the predetermined pass phrase, the application will send an authentication request to the Authentication server 16. The Authentication request will include both identification of the account (or identification of the registered account holder who the user purports to be) and will include the compressed audio data packets representing the user uttering the predetermined pass phrase. The Internet telephony application 42 will not complete the Internet-Telephony-to-PSTN call until the user has been authenticated by the Authentication server 16.

The authentication server 16 functions to compare the compressed audio formants representing the user uttering the predetermined pass phrase with sample compressed audio formants representing the registered account holder uttering the same predetermined pass phrase to determine if the user is really the registered account holder.

Although FIG. 1 shows the application server 14 and the authentication server 16 as two separate pieces of hardware interconnected by the network 18, it is envisioned that both the application server 14 and the authentication server 16 may be at the same location coupled by a local area network, may be operating on the same hardware server, or the authentication server 14 structure and functionality may even be integrated with the application server 14.

The authentication server 16 includes a network interface circuit 54 and a network interface driver 56 which together include the hardware and software circuits for operating the IP protocols for communication with the application server 14.

The authentication server 16 also includes an authentication application 58 and is coupled to a secure database 60. The secure database 60 includes a sample array of compressed audio formants for each registered account holder which represents such registered account holder uttering the predetermined pass phrase.

In operation, when the authentication server 16 receives an authentication request from the application server 12, regenerates the array of frames of compressed audio formants, and compares the array of compressed audio formants from the authentication request to the sample array of compressed audio formants of the registered account holder as retrieved from the secure database 60 and makes a determination as to whether the speaker is the account holder based on whether the digital audio data matches.

Figure 2:
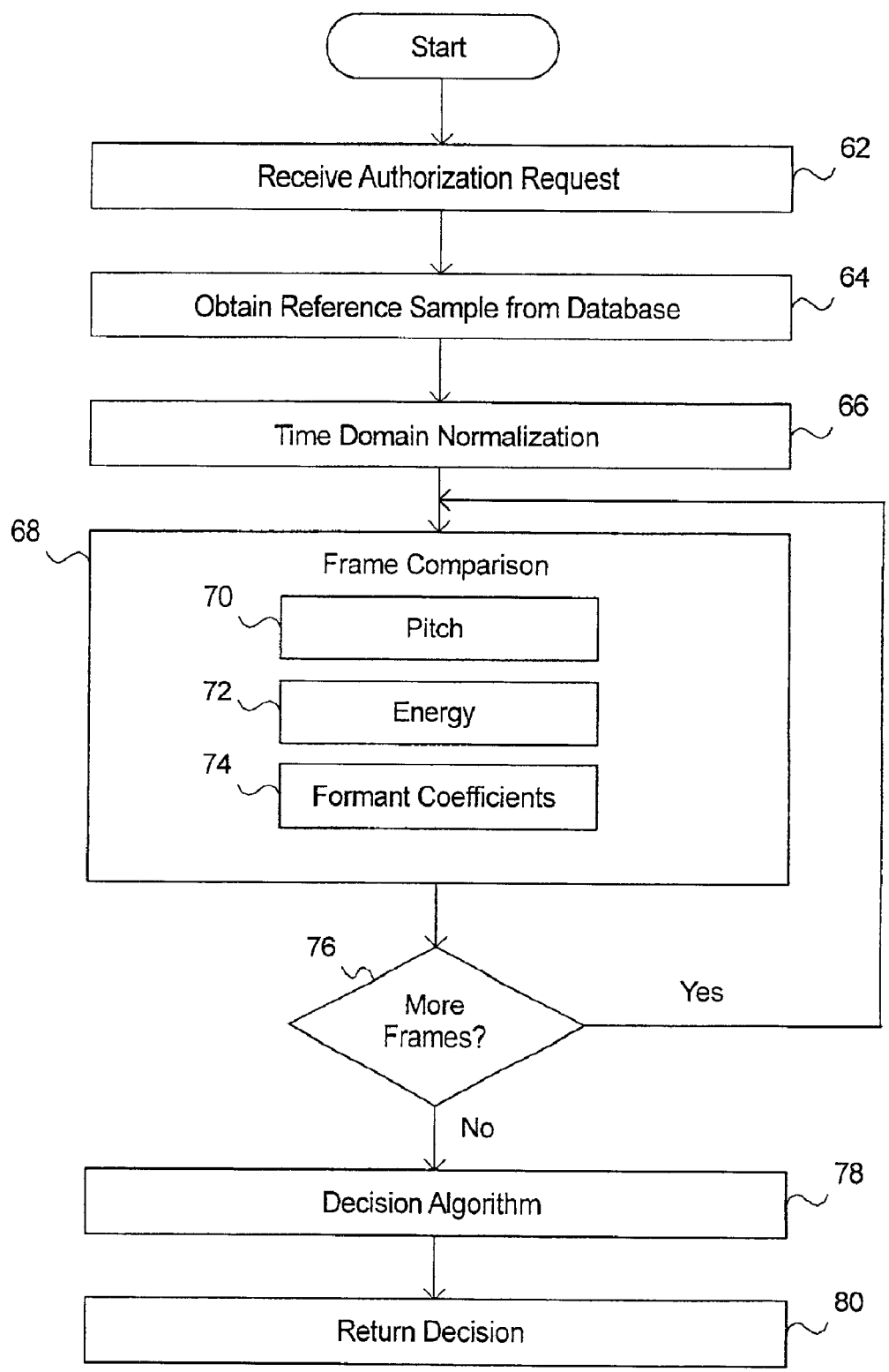
FIG. 2 is a flow chart showing exemplary operation of a speaker verification application in accordance with this invention.

Turning to the flowchart of FIG. 2, in conjunction with FIG. 1, a more detailed operation of the authentication application 58 is shown. Step 62 represents receipt of an authentication request from the application server 14. As discussed previously, an authentication request will include identification of the account (or identification of the registered account holder who the user of the Internet telephony client 12(a) purports to be) and compressed audio data packets representing an array of frames of compressed audio formants representing the user uttering the predetermined pass phrase.

At step 64, the authentication application 58 will retrieve the sample array of frames of compressed audio formants representing the registered account holder uttering the predetermined pass phrase.

Step 66 represents normalizing the array of frames of compressed audio formants representing the speaker to the sample array of frames of compressed audio formants retrieved from the database 60 in the time domain. Briefly referring to FIG. 3, a table representing Compressed audio formants of an utterance 82 is shown. The utterance 82 is represented by a sequence of frames 84(1) to 84(n), each representing a fraction of one second of an utterance in the time domain. For example, if the ITU G.723 compression standard is utilized, each frame represents 0.0333 seconds and if the ITU G.729 compression standard is utilized, each frame segment represents 0.01 seconds.

Each frame includes a pitch value and an energy value representing the residue of the speaker and a set of formant coefficients representing the resonance of the speaker. Together, the residue and resonance of each of the sequence of frames may be used to re-create analog audio data. The sequence of analog audio data recreated from the sequence of frames would be very similar to the original analog data utilized to create the array of frames of compressed audio formants of utterance 82.

As such, it should be appreciated that the utterance of a pass phrase lasting on the order of one or more seconds will be represented by many frames of data. To accurately compare a sequence of frames representing the user uttering the predetermined pass phrase (as retrieved from the authentication request) to the sample sequence of frames representing the accountholder uttering the predetermined pass phrase (as retrieved from the database 60), the two sequences must be aligned, or time warped, within the time domain such that the portion of the word represented by each frame can accurately be compared to a frame in the sample sequence which corresponds to the same portion of the pass phrase.

Figure 4:
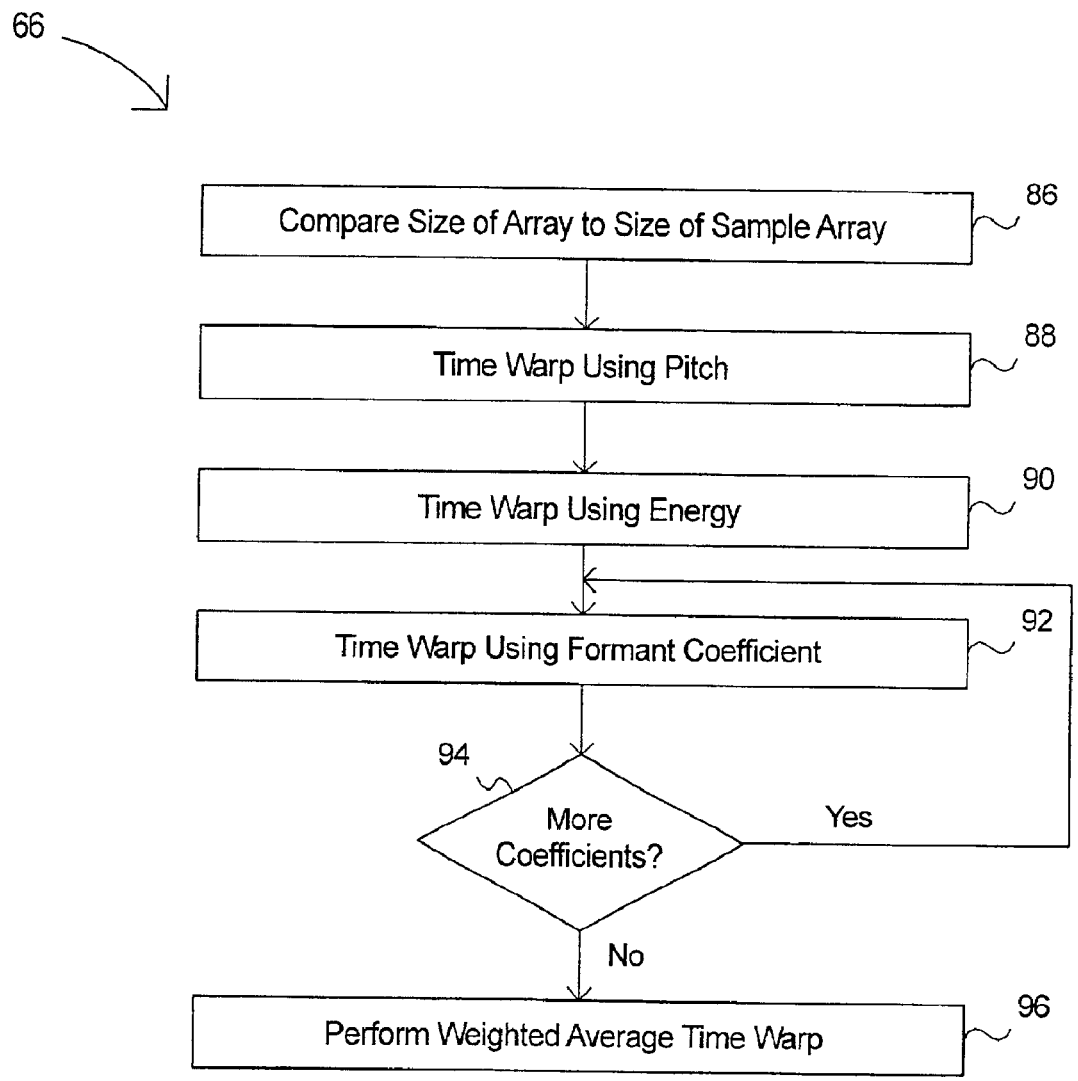
FIG. 4 is a flow chart showing exemplary time warping in accordance with this invention.

Referring to FIG. 4, a more detailed flowchart showing exemplary time warping steps is shown. Step 86 represents comparing the quantity of frames in the array representing the speaker with the quantity of frames in the sample array to determine which is the larger of the two arrays and to determine the total number of frame which must be decimated from the larger array to equal the total number of frames in the smaller array. For example, if the array representing the speaker includes 100 frames while the sample array includes 110 frames, 10 frames must be decimated from the sample array such that the two arrays are the same size.

Step 88 represents performing a time warp using the pitch value of each frame in each array. More specifically, such pitch values are used to identify which frames in the larger array (e.g. which 10 frames in the sample array) should be decimated to provide a "best fit" alignments between the two arrays after decimation.

Step 90 represents performing a time warp using the energy value of each frame in the array. Again, such energy values are used to identify which frames in the larger array should be decimated to provide a "best fit" between the two arrays after decimation.

Steps 92 and 94 represent performing a plurality of time warps, each using one of the rows of formant coefficients in each array to identify which frames in the larger array should be decimated to provide a "best fit" between the two arrays after decimation. It should be appreciated that each time warp performed at steps 88, 90, and 92 may provide for decimation of different frames. As such, step 96 represents selecting which frames to decimate from the larger array utilizing a weighted average of frames selected for decimation in each of steps 88, 90, and 92.

Returning to FIG. 2, after normalization within the time domain at step 66, Steps 68 and 70 represent a frame by frame comparison of the compressed audio formants of the normalized array representing the user uttering the predetermined pass phrase to the compressed audio formants of the normalized sample array.

More specifically, at step 68, the pitch, energy, and each formant coefficient from a frame from the array of frames representing the user is compared to the pitch, energy and each formant coefficient respectively of the corresponding frame from the sample array of frames to obtain raw values of the difference which are input to a discrepancy array at sub steps 70, 72, and 74 respectively. Step 76 is a decision box indicated that if more frames exist to compare, the system returns to step 68 to compare the next frame.

It should be appreciated that after a comparison of each frame is completed, the discrepancy array will be the same size (e.g. same number of rows and columns) as the two arrays (after normalization within the time domain).

Step 78 represents making a determination as to whether the entire utterance of the user matches, within a threshold, the entire utterance of the registered account holder (e.g. sample array of compressed audio formants). More specifically, step 78 represents utilizing a weighted average of each value within the discrepancy array to generate a discrepancy value which, if within a predetermined threshold, indicates a match.

Step 80 represents the authentication application returning an authentication response to the application server 14 indicating whether the pass phrase utterance of the user of the Internet telephony client 12(*a*) matches the utterance of the registered account holder.

The above described systems provide for remote speaker verification utilizing compressed audio formants. As such, speaker verification may be obtained without the complications of converting compressed audio formants to raw analog or digital audio data for comparison and is not subject to distortion associated with converting to analog or digital audio data.

Although the invention has been shown and described with respect to certain preferred embodiments, it is obvious that equivalents and modifications will occur to others skilled in the art upon the reading and understanding of the specification. For example, although the specification provides for comparing the array of frames of compressed audio formants representing the user to the sample array of frames utilizing a weighted average of each raw discrepancy value, other decision making algorithms are envisioned by this invention. The present invention includes all such equivalents and modifications, and is limited only by the scope of the following claims.

What is claimed is:

1. A method of performing speaker verification to determine whether a speaker is a registered speaker, the method comprising:

a) obtaining an array of frames of compressed audio formants representing the speaker uttering a predetermined pass phrase, each frame within the array including:

i) energy data and pitch data characterizing the residue of the speaker uttering the predetermined pass phrase; and ii) a plurality of formant coefficients characterizing the resonance of the speaker uttering the predetermined pass phrase; and b) performing a time domain normalization of the array of frames of compressed audio formants to a sample array of frames of compressed audio formants such that such that the two arrays are of an equal quantity of frames:

c) determining whether the speaker is the registered speaker by:

generating an array of discrepancy values, each discrepancy value representing the difference between one of: i) an energy value; ii) a pitch value; and iii) a formant coefficient value of a frame of the array and a corresponding energy value: ii) pitch value: and iii) formant coefficient value of a corresponding frame in the sample array; and determining whether the array of discrepancy values is within a predetermined threshold.

2. The method of performing speaker verification of claim 1, wherein performing a time domain normalization comprises:

comparing the quantity of frames in the array with the quantity of frames in the sample array to determine the quantity of frames to be decimated from the larger of the two arrays such that the two arrays are of an equal quantity of frames;

selecting a pitch decimation group of frames from the larger of the two arrays, the pitch decimation group being the selection of frames which, if decimated, yields the best alignment between the pitch values of the two arrays after decimation;

selecting an energy decimation group of frames from the larger of the two arrays, the energy decimation group being the selection of frames which, if decimated, yields the best alignment between the energy values of the two arrays after decimation;

selecting a plurality of formant coefficient decimation groups, each formant coefficient decimation group being a selection of frames from the larger of the two arrays which, if decimated, yields the best alignment between the formant coefficient values of the two arrays after decimation; and determining a decimation group of frames from the larger of the two arrays, the decimation group being a quantity of frames equal to the quantity of frames to be decimated and being the frames which are selected by weighted average from the pitch decimation group, the energy decimation group, and each formant coefficient decimation group; and decimating the decimation group of frames from the larger of the two arrays.

3. The method of performing speaker verification of claim 2, wherein the step of obtaining an array of frames of compressed audio formants includes receiving the frames of compressed audio formants from a remote Internet telephony device.

4. The method of performing speaker verification of claim 3, wherein the step of obtaining an array of frames of compressed audio formants from the remote Internet telephony device comprises receiving audio input of the speaker uttering the pass phrase from a microphone, and digitizing the audio input, converting the digitized audio input to a sequence of frames of compressed audio formants.

5. A method of determining whether a speaker is a registered speaker, the method comprising:
 a) obtaining compressed audio formants for each frame of an array of frames representing the speaker uttering a predetermined pass phrase:
 b) performing a time domain normalization of the array to a sample array of frames stored in a memory and representing the registered speaker uttering the predetermined pass phrase to decimate a portion of the frames of the larger of the two arrays such that the two arrays, after decimation, are of an equal quantity of frames, the portion of the frames to be decimated being selected by:
   selecting a plurality of audio ferment decimation groups, each audio formant decimation group being a selection of frames from the larger of the two arrays which, if decimated, yields the best alignment between a formant coefficient value of each frame of each the array and the corresponding formant coefficient value of each frame of the sample array; and
   determining a decimation group of frames from the larger of the two arrays, the decimation group being a quantity of frames equal to the quantity of frames to be decimated and being the frames which are selected by weighted average from each of the audio format decimation groups;
 c) generating an array of discrepancy values, each discrepancy value representing the difference between one of an audio formant value of a frame of the array and a corresponding audio formant value of a corresponding frame of the sample array; and
 d) determining that the remote speaker is the registered speaker if the array of discrepancy values is within a predetermined threshold.

6. The method of determining whether a speaker is a registered speaker of claim 5, wherein
 determining the decimation group of frames comprises:
 selecting a pitch decimation group of frames from the larger of the two arrays, the pitch decimation group being the selection of frames which, if decimated, yields the best alignment between the pitch values of the two arrays after decimation;
 selecting an energy decimation group of frames from the larger of the two arrays, the energy decimation group being the selection of frames which, if decimated, yields the best alignment between the energy values of the two arrays after decimation;
 selecting a plurality of formant coefficient decimation groups, each formant coefficient decimation group being a selection of frames from the larger of the two arrays which, if decimated, yields the best alignment between the formant coefficient values of the two after decimation; and
 selecting frames from the larger of the two arrays for the decimation group by weighted average from the pitch decimation group, the energy decimation group, and each formant coefficient decimation group.

7. The method of determining whether a speaker is a registered speaker of claim 6, wherein the step of obtaining compressed audio formants includes obtaining the compressed audio formants from a remote location and sending the compressed audio formants from the remote location.

8. The method of determining whether a speaker is a registered speaker of claim 7, wherein the step of obtaining compressed audio formants at a remote location includes receiving audio input of the speaker uttering the pass phrase from a microphone, digitizing the audio input, and compressing the digitized audio input to generate compressed audio formants.

9. A speaker verification server for determining whether a remote speaker is a registered speaker, the server comprising:
 a) a network interface for receiving, via a packet switched network, compressed audio formants for each frame of an array of frames representing the remote speaker uttering a predetermined pass phrase as audio input to a remote telephony client;
 b) a database storing compressed audio formants for each frame of a sample array of representing the registered speaker uttering the predetermined pass phrase as audio input; and
 c) a verification application operatively coupled to each of the network interface and the database for comparing the compressed audio formants of the array of frames to the compressed audio formants of the sample array of frames to determine whether the remote speaker is the registered speaker by:
   performing a time domain normalization of the array to the sample array such that such that the two arrays are of an equal quantity of frames;
   generating an array of discrepancy values, each discrepancy value representing the difference between one of an audio formant value of a frame of the array and a corresponding audio formant value of a corresponding frame of the sample array; and
   determining that the remote speaker is the registered speaker if the array of discrepancy values is within a predetermined threshold.

10. The speaker verification server of claim 9, wherein the verification application performs time domain normalization by:
 comparing the quantity of frames in the array with the quantity of frames in the sample array to determine the quantity of frames to be decimated from the larger of the two arrays such that the two arrays are of an equal quantity of frames;
 selecting a plurality of audio formant decimation groups, each audio formant decimation group being a selection of frames from the larger of the two arrays which, if decimated, yields the best alignment between a formant coefficient value of each frame of each the array and the corresponding formant coefficient value of each frame of the sample array after decimation; and
 determining a decimation group of frames from the larger of the two arrays, the decimation group being a quantity of frames equal to the quantity of frames to be decimated and being the frames which are selected by weighted average from each of the audio formant decimation groups; and
 decimating the decimation group of frames from the larger of the two arrays.

11. The speaker verification server of claim 10, wherein the compressed audio formants include energy data and pitch data characterizing the residue of the speaker uttering the predetermined pass phrase and formant coefficients characterizing the resonance of the speaker uttering the predetermined pass phrase; and each frame includes an energy value and pitch value characterizing the residue of the registered speaker uttering the registered pass phrase and formant coefficient values characterizing the resonance of the registered speaker uttering the registered pass phrase.

12. The speaker verification server of claim 11, wherein the verification application determines the decimation group of frames by:

selecting a pitch decimation group of frames from the larger of the two arrays, the pitch decimation group being the selection of frames which, if decimated, yields the best alignment between the pitch values of the two arrays after decimation;

selecting an energy decimation group of frames from the larger of the two arrays, the energy decimation group being the selection of frames which, if decimated, yields the best alignment between the energy values of the two arrays after decimation;

selecting a plurality of formant coefficient decimation groups, each formant coefficient decimation group being a selection of frames from the larger of the two arrays which, if decimated, yields the best alignment between the formant coefficient values of the two after decimation; and selecting frames from the larger of the two arrays for the decimation group by weighted average from the pitch decimation group, the energy decimation group, and each formant coefficient decimation group.

* * * * *

UNITED STATES PATENT AND TRADEMARK OFFICE
CERTIFICATE OF CORRECTION

PATENT NO. : 6,898,568 B2
DATED : May 24, 2005
INVENTOR(S) : Ng, Kai Wa; Lin, Nan Sheng and Ouyang, Jing Zheng It is certified that error appears in the above-identified patent and that said Letters Patent is hereby corrected as shown below:

Column 10,
Line 16, should read -- ...of frames of compressed audio formats such that the two arrays ....... --

Column 11,
Line 21, replace word "ferment" with -- formant --.
Line 26, should read -- ...each of the array ....... --
Line 33, replace word "format" with -- formant --.
Line 20, should read -- ...frame of sample array of frames representing the registered.... --

Column 12,
Line 31, should read -- ...the sample array such that the two arrays ....... --
Line 53, should read -- ... coefficient value of each frame of the array and the .... --

Column 13,
Line 3, should read -- ...energy value and a pitch value characterizing teh residue of.... --

Signed and Sealed this

Ninth Day of August, 2005

JON W. DUDAS
*Director of the United States Patent and Trademark Office*